United States Patent [19]

Barbosa et al.

[11] Patent Number: 4,637,517

[45] Date of Patent: Jan. 20, 1987

[54] RADIATOR BRACKET

[76] Inventors: António B. Barbosa, Rua de Cabanas, 4420 Gondomar; Joaquim C. de Campos, Rua Faria Guimaraes, 377, 4000 Porto, both of Portugal

[21] Appl. No.: 648,491

[22] Filed: Sep. 10, 1984

[51] Int. Cl.⁴ .............................................. A47F 5/00
[52] U.S. Cl. ...................................... 211/86; 248/348
[58] Field of Search .................... 211/86, 16; 248/348, 248/201, 188.8

[56] References Cited

U.S. PATENT DOCUMENTS

| | | | |
|---|---|---|---|
| 841,985 | 1/1907 | Kinnear | 248/348 X |
| 1,159,357 | 11/1915 | Burmeister | 248/348 X |
| 1,339,576 | 5/1925 | Kennard | 211/86 |
| 1,549,171 | 8/1925 | Walker | 211/86 |
| 1,561,575 | 11/1925 | Swanson | 211/86 X |
| 1,632,032 | 6/1927 | McArdle | 211/86 |
| 3,662,428 | 5/1972 | Koehl | 248/188.8 X |
| 4,459,920 | 7/1984 | Cwik | 248/188.8 X |

*Primary Examiner*—Ramon S. Britts
*Assistant Examiner*—Sarah A. Lechok Eley
*Attorney, Agent, or Firm*—Wolf, Greenfield & Sacks

[57] ABSTRACT

A bracket for attachment to a wide, narrow object and more particularly to a section of a radiator. The bracket may be attached to either the bottom or top of the radiator. When attached to the bottom of the radiator, it includes castors to provide mobility for the radiator. When attached to the top of the radiator, the bracket includes arms that serve as hangers for articles, such as wet clothing to be dried by the radiator.

1 Claim, 8 Drawing Figures

RADIATOR BRACKET

BACKGROUND OF THE INVENTION

This invention relates to a bracket to be used in conjunction with a portable electric radiator.

Due to the dramatic increase in heating costs since the mid-1970's, various devices for providing a warm environment inside buildings have been developed or given new emphasis. One of these devices is a radiator heated by electricity. The radiator is permanently filled with oil to distribute the heat evenly in the radiator. The heat is then transferred to the surrounding air by convection and radiation.

A major advantage of the electric radiator as compared to alternative supplementary heating devices such as wood or coal burning stoves and solar energy systems is that it need not be permanently fixed in a particular location and therefore, may be moved into any room in which additional heat is required. Since the weight of the radiator makes it impractical for it to be carried from one room to another, means are employed to mount the radiator on wheels.

The prior means involved a castor base to which castors are attached on the ends. In order to attach this support device to the radiator, it is necessary to lie the radiator on its side with its handle facing up. A U-shaped bracket is then hooked through a hole in the castor base, over the bottom section and then back through a second hole in the castor base. The U-shaped bracket is then immobilized by affixing a washer and wing nut on the bracket on the bottom face of the castor base.

Heaters, such as radiators, have also been used to dry clothing and other articles. Typically, such use has involved placing wet articles on the radiator. This method wastes energy and is consequently expensive since the articles continue to absorb large amounts of heat even after they have dried.

SUMMARY OF THE INVENTION

The bracket of this invention is easily attached to the bottom or top section of a radiator or a similarly shaped object. The bracket has a generally horizontally elongated U-shape. It is comprised of two similar sections which are fused together creating a horizontal channel between the two side walls of the bracket which corresponds to the size and shape of the top or bottom edge of the radiator to which it is to be attached. The bracket is attached by merely fitting the edge of the radiator into the channel in the bracket.

The bracket has means for attaching a post. When the bracket is used to facilitate mobility for the radiator, each end of the bottom face of the bracket is connected to the post of a castor. The castors enable the radiator to be easily moved to a different location. When the bracket is attached to the top edge of the radiator, the posts attached to each end of the bracket serve as support arms from which various objects, such as wet clothing, may be hung.

It is an object of the invention to provide an improved means for attaching castors to a radiator. Another object of the invention is to provide a means for hanging articles over a radiator for drying.

DESCRIPTION OF THE DRAWINGS

The foregoing and other objects and advantages of the invention will be understood more fully from the following detailed description thereof, with reference to the accompanying drawings wherein.

DESCRIPTION OF THE PREFERRED EMBODIMENT

Figure 1:
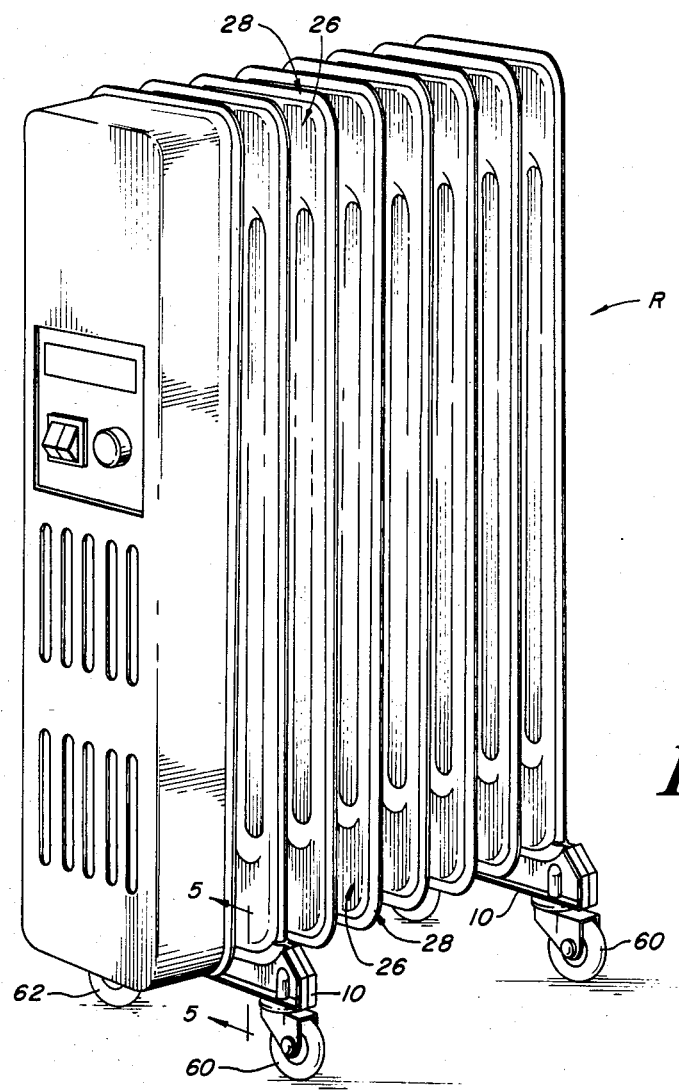
FIG. 1 illustration of a radiator assembly including a pair of brackets that carry castors constructed in accordance with this invention.
Figure 2:
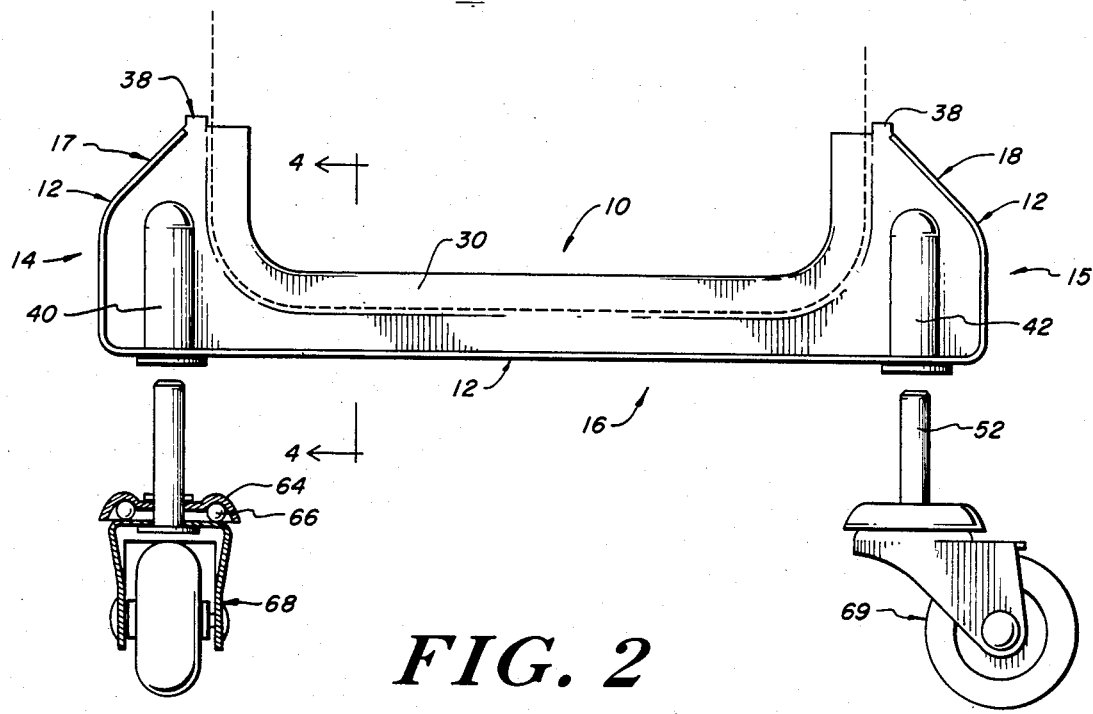
FIG. 2 is a front elevation of one of the brackets.

The radiator assembly shown in FIG. 1 includes a main radiator frame R and a pair of brackets 10 carrying castors 60 and 62. As shown in FIG. 2, the bracket includes a generally horizontally elongated U-shaped body. This body 10 can be formed by stamping two identical sections on a single sheet of metal and then bending the sheet so that the sections can be fused together. Alternatively, two separate identical sections may be joined to form the body. The body 10 has a flange 12 which is attached to the ends 14, 15 and the bottom 16 of the body 10. The bracket is preferably fabricated from steel.

Figure 3:
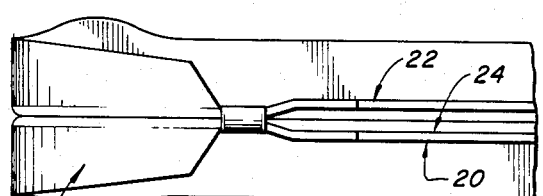
FIG. 3 is a fragmentary plan view of the bracket.
Figure 4:
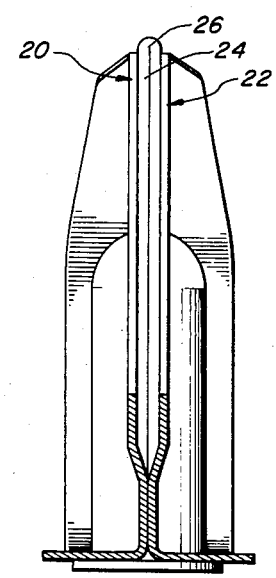
FIG. 4 is a sectional elevation of the bracket as seen along line 4—4 FIG. 2.
Figure 5:
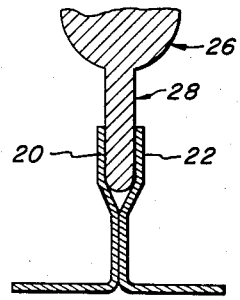
FIG. 5 is a sectional elevation of the bracket attached to the edge of a radiator as seen along line 5—5 of FIG. 1.

As shown in FIGS. 3, 4 and 5 the bracket 10 has elongated side walls 20, 22 that confront each other so as to define a vertical channel 24 into which a top or bottom of a radiator section 26 is fitted to attach the bracket to the radiator. The channel 24 is sized so as to create a tight fit when the bracket is mounted on the thin flange 28 which circumscribes the radiator section and oriented in a vertical plane. The bracket is easily mounted on the radiator by merely positioning the channel 24 either directly above or below the radiator section 26 to which it is to be attached and then pushing the bracket onto the radiator flange 28 which fits snugly therein. This attachment procedure is simple, quick and does not require use of tools or fasteners.

Each side wall 20, 22 is generally flat except for an off-set upper ridge 30, 32 which defines the channel 24 and a pair of semi-cylinders 34, 36. The ridges 30, 32 are horizontally elongated U-shaped and the channel 24 defined thereby allows the radiator flange 28 to fit into the channel 24 on three sides for increased support and stability. The depth of the channel 24 is defined by the height of the ridges 30, 32.

The semi-cylinders 34, 36 of each side wall 20, 22 are so positioned as to form two sockets or cylinders 40, 42. Each socket 40, 42 is positioned near an end 14, 15 of the body 10 and is the same distance from the adjacent end of the body 10 so as to provide balance for the bracket.

The width of the flange 12 is equal to or slightly greater than the diameter of the sockets 40, 42 so as to protect the sockets 40, 42 from impact. The flange 12 extends perpendicularly upward from the bottom of the body on each end 14 and 15 of the body 10. In the preferred embodiment, an upper part 17, 18 of the flange 12 on the ends 14, 15 of the body 10 bends upwardly towards the center of the body 10 at an angle preferably of the order of 45° to meet a top edge 38 of the body 10. This construction has no exposed sharp edges and thereby prevents injury both to persons and objects from impact with the bracket.

Figure 6:
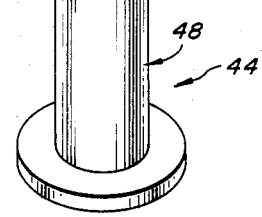
FIG. 6 is a perspective illustration of a sleeve which is inserted in a cylinder in the bracket and which in turn receives the post of a castor or support arm.

In the preferred embodiment, a sleeve 44 shown in FIG. 6, preferably made of plastic, is inserted into each socket 40, 42 to secure a post of a castor 52 or of a support arm 54 which may be inserted therein. The sleeve 44 is cylindrical with a circular lip 46 at its outer end which is affixed to the outer face of the flange 12, thereby immobilizing the sleeve 44. The cylindrical body 48 of the sleeve 44 has two slots 49, 50 on opposite sides of the inner most end 51 of the body 48. The slots 49, 50 provide flexibility for the end 51 and when the post 52, 54 is inserted into the sleeve 44, outward pressure is exerted on the flexible end 51 against the cylinder 40, 42. This construction serves to further secure the posts 52, 54 to the bracket.

Figure 8:
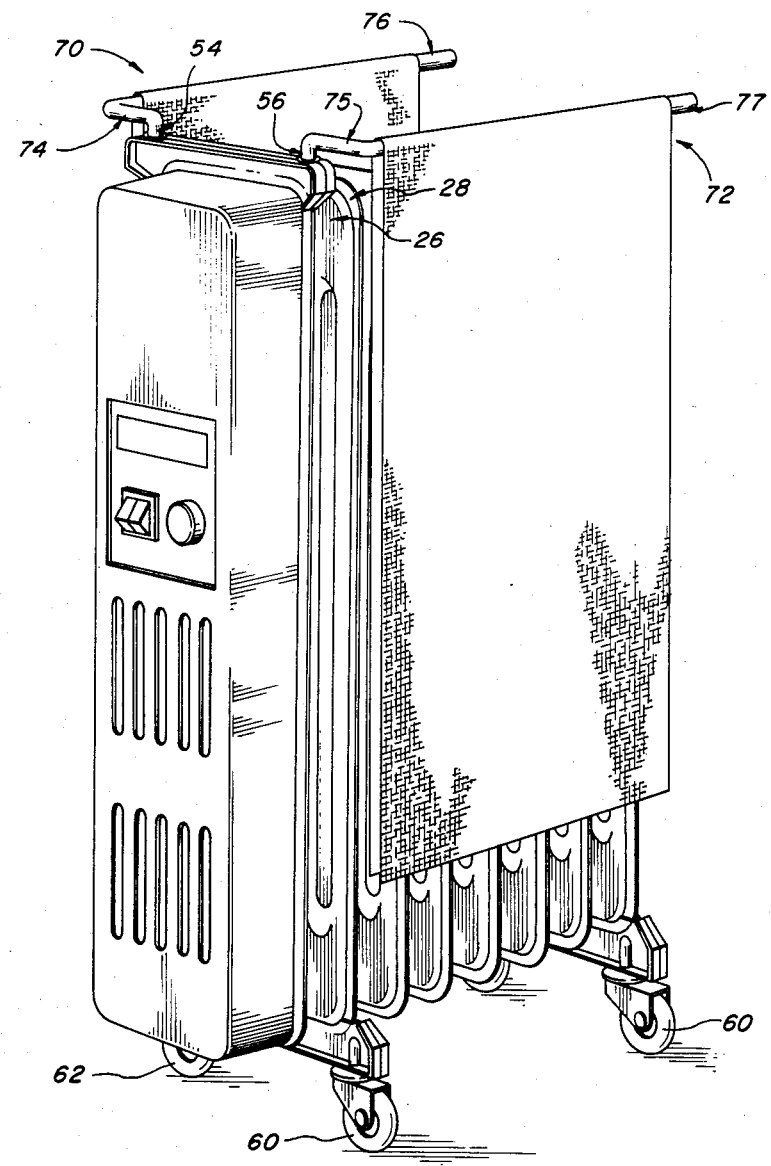
FIG. 8 is an illustration of a radiator to which brackets have been attached to provide both mobility and support for hanging articles.

As shown in FIGS. 1 and 8, when the bracket is used to facilitate mobility for a radiator, two castors 60, 62 are attached to each bracket and two brackets are attached to the radiator. Although any standard castor may be used, in the preferred embodiment the post 52 of the castor is affixed to an annular upper member 64. The annular upper member 64 holds a plurality of ball bearings 66 which facilitate rotation of a bifurcated swivel frame 68. The swivel frame 68 has means for eccentric mounting of the frame 68 to the post 52. The swivel frame 68 has means for supporting a wheel 69 within the frame 68.

Figure 7:
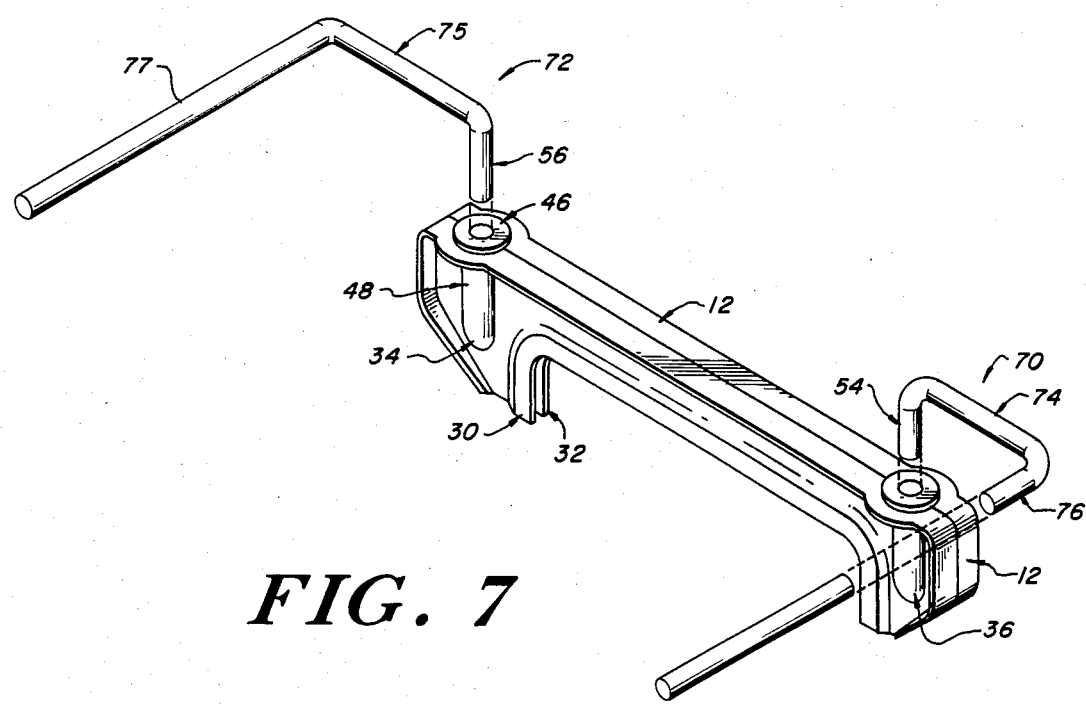
FIG. 7 is a perspective view of the bracket and showing support arms to the bracket.

As can be seen in FIG. 7, when the bracket is attached to the top of a radiator section, the post 54, 56 inserted in the socket 40, 42 serve as a support arm 70, 72 from which various objects may be hung. The support arms 70 and 72 and the castors 60 and 62 are generically termed fixtures. The support arms 70, 72 extend linearly and then bend at a right angle to form sections 74, 75 which extend to the side of the radiator. The sections 74, 75 of the support arms 70, 72 have a 90° angle bend so that the support arms 70, 72 form sections 76, 77 which are parallel with the sides of the radiator. The configuration of the support arms 70, 72 enables objects hung therefrom to be positioned next to the radiator without contacting the radiator surface and thereby avoids dirt which may have been deposited on the radiator. The configuration also allows the article to hang in a straight, unfolded manner.

It should be understood that the foregoing description of the invention is intended merely to be illustrative thereof and that other modifications and embodiments may be apparent to those skilled in the art without departing from its spirit.

Having thus described the invention, what I desire to claim and secure by Letters Patent is:

1. An attachment for a portable radiator having a plurality of radiator sections, each of said sections including a vertically-oriented radiator flange which circumscribes said section, said flange having two vertically extending sides, a top side and a bottom side, comprising:

a bracket having a generally U-shaped body including two elongated, parallel and coextensive sidewalls which confront each other to define a horizontal U-shaped channel, said channel being sized for snugly and alternatively receiving and engaging the bottom and two vertical sides and the top and two vertical sides of a radiator flange, said sidewalls being integrally connected so as to form a single unit, a socket in said body adjacent each end thereof, said socket being sized for receiving a post, a castor having a post removably connected to said body with said post secured in said socket, whereby said castor provides mobility to a radiator when the bracket receives the bottom and two vertical sides of said radiator flange, and a hanger having a post removably connected to said body with said post secured in said socket when the bracket receives the top and vertical sides of said radiator, whereby said hanger enables articles to be hung along the sides of the radiator.

* * * * *